(12) United States Patent
Chen

(10) Patent No.: US 6,358,008 B1
(45) Date of Patent: Mar. 19, 2002

(54) PROPELLER ASSEMBLY FOR A MARINE VEHICLE

(75) Inventor: Liheng Chen, Schaumburg, IL (US)

(73) Assignee: Turning Point Propellers, Inc., Schaumburg, IL (US)

( * ) Notice: Subject to any disclaimer, the term of this patent is extended or adjusted under 35 U.S.C. 154(b) by 0 days.

(21) Appl. No.: 09/612,441

(22) Filed: Jul. 7, 2000

(51) Int. Cl.[7] .................................................. B63H 1/20
(52) U.S. Cl. .......................... 416/134 R; 416/93 A; 416/245 A; 464/182; 440/83
(58) Field of Search ...................... 416/93 A, 134 R, 416/245 A, 244 R; 464/182, 89; 440/49, 83

(56) References Cited

U.S. PATENT DOCUMENTS 5,252,028 A   10/1993   Lobosco et al. ............... 416/93
5,527,153 A * 6/1996   Bernhardt ..................... 416/46
5,967,751 A   10/1999  Chen ............................ 416/93

* cited by examiner

Primary Examiner—Edward K. Look
Assistant Examiner—Richard Edgar
(74) Attorney, Agent, or Firm—Boyle Fredrickson Newholm Stein & Gratz S.C.

(57) ABSTRACT

A propeller assembly is provided for mounting on a rotatable propeller shaft of a marine vehicle. The propeller assembly includes a central hub mounted on the propeller shaft for rotation therewith. A generally tubular propeller housing is slidable on the central hub for rotational movement with the propeller shaft. The propeller housing includes an inner surface having a shoulder formed therein. A locking ring is mounted on the propeller shaft. The locking ring includes an outer rim for engaging the shoulder and preventing removal of the propeller housing from the central hub. A stop member may also be provided to limit movement between the propeller housing and the central hub.

19 Claims, 2 Drawing Sheets

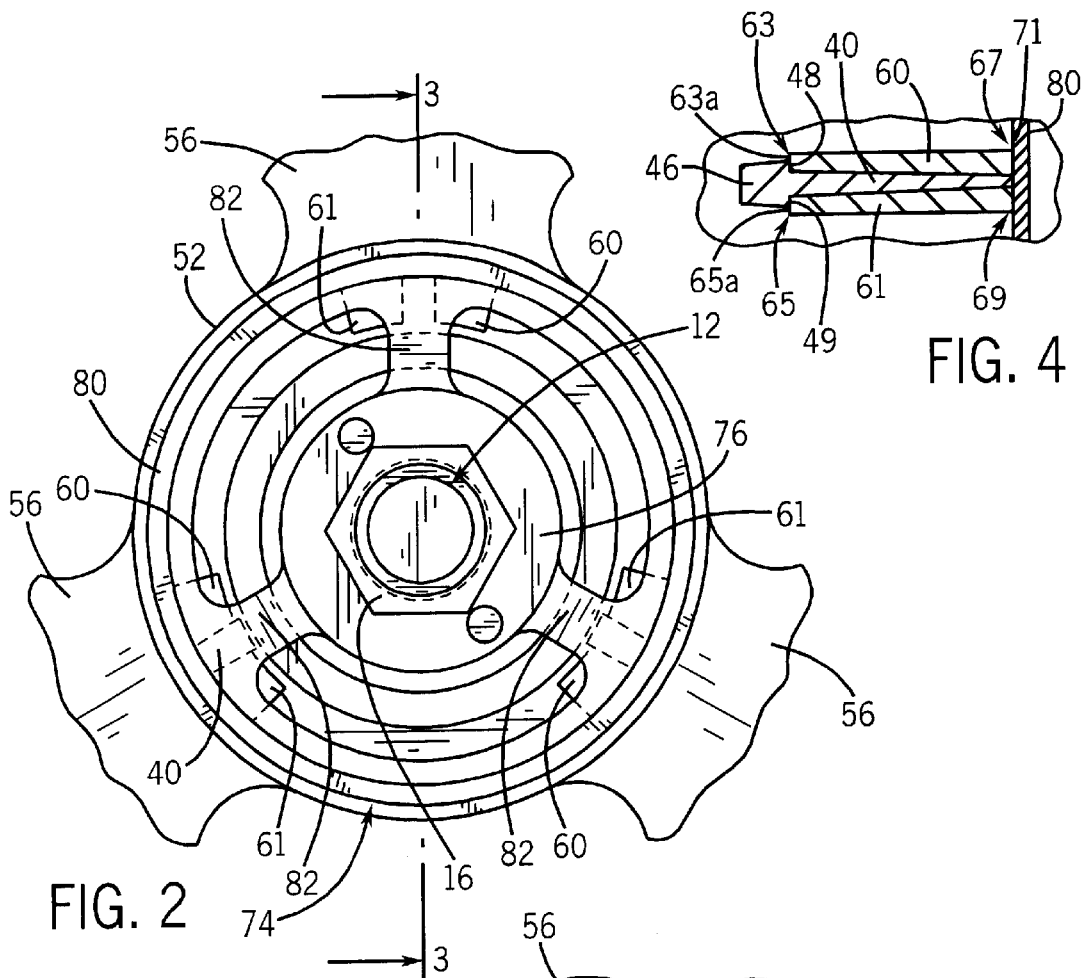
FIG. 4
FIG. 2
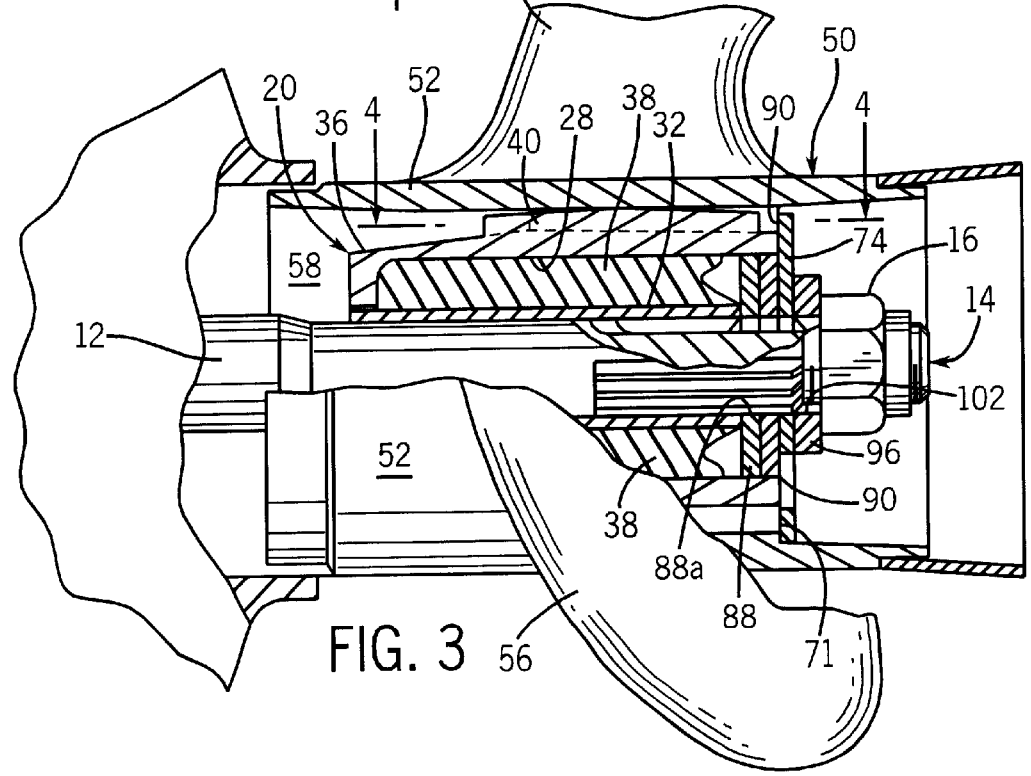
FIG. 3

PROPELLER ASSEMBLY FOR A MARINE VEHICLE

FIELD OF THE INVENTION

This invention relates to a propeller assembly, and in particular, a propeller assembly for a marine vehicle.

BACKGROUND AND SUMMARY OF THE INVENTION

It is known to propel a marine vehicle utilizing a propeller assembly mounted on rotatable drive shaft. The propeller assembly includes propeller blades extending radially from a central hub. A motor rotates the drive shaft which, in turn, rotates the propeller blades propelling the marine vehicle through the water.

Typically, the propeller assembly is constructed as a unit wherein the propeller blades and the central hub are mounted or removed from the drive shaft in unison. Alternatively, in order to reduce the time and costs associated with replacing the propeller blades, it has been contemplated to provide a propeller assembly for a marine engine wherein the propeller blades project from a propeller housing that is removable from a central hub. For example, LoBosco et al, U.S. Pat. No. 5,252,028 discloses a marine propeller assembly having a propeller housing which is slidably receivable on a central hub in order to be rotated therewith. The central hub is mounted on the propeller shaft and a retaining disc is threaded onto the propeller shaft to retain the propeller housing on the central hub. It has been determined, however, that the retainer disc does not adequately retain the propeller housing on the central hub such that the propeller housing may become inadvertently disengaged from the central hub resulting in the propeller housing falling from the propeller shaft during use.

Chen, U.S. Pat. No. 5,967,751 also discloses a marine propeller assembly. The propeller assembly includes a central hub secured to the propeller shaft and having three or more axially extending keys on the outer surface thereof. A propeller housing includes an inner surface having three or more pairs of lobes for forming keyways which receive the keys of the central hub. A retainer disc is threaded on a propeller shaft and includes a plurality of angularly spaced ears for engaging with the lobes on the inner surface on the propeller housing in order to prevent the propeller housing from being disengaged from the central hub.

As described, the propeller assembly disclosed in the Chen '751 patent overcomes the limitations of the structure disclosed in the LoBosco et al '028 patent. However, it has been found that the keys extending from the central hub have a tendency to become stuck within the corresponding keyways along the inner surface of the propeller housing. As a result, it may be difficult for an individual to remove the propeller housing from the central hub during maintenance, replacement or the like.

Further, it is highly desirable to retain the propeller housing on the central hub in such a manner to prevent any unnecessary movement of the propeller housing which may reduce the efficiency of the propeller assembly. The structure disclosed in the Chen '751 patent includes a retainer disc having a plurality of angularly spaced ears which engage lobes and stops on the inner surface of the propeller housing in order to prevent the propeller housing from becoming disengaged from the central hub. However, due to manufacturing constraints, the ears may not tightly engage corresponding lobes and/or stops along the inner surface of the propeller housing thereby allowing for the possible movement of the propeller housing during use. As such, it is highly desirable to provide a locking mechanism for securely retaining the propeller housing on the central hub.

Therefore, it is a primary object and feature of the present invention to provide a propeller assembly which may be securely mounted to a propeller shaft of a marine vehicle.

It is a still further object and feature of the present invention to provide a propeller assembly which is simple and inexpensive to manufacture.

It is a still further object and feature of the present invention to provide a propeller assembly which incorporates a propeller housing which may be simply and easily mounted on a central hub which, in turn, is retained on a propeller shaft of a marine vehicle.

In accordance with the present invention, a propeller assembly is provided for mounting on a rotatable propeller shaft of a watercraft. The propeller assembly includes a central hub mounted on a propeller shaft for rotational movement therewith. The central hub defines a generally cylindrical outer surface having a plurality of circumferentially spaced keys therealong. A generally tubular propeller housing is slidable on the central hub for rotational movement with the propeller shaft. The propeller housing includes an inner surface having a plurality of circumferentially spaced pairs of axially extending lobes therealong. Each pair of lobes define a corresponding keyway for receiving a corresponding key along the central hub. A locking ring is mountable on the propeller shaft. The locking ring includes a generally central disc having an aperture for receiving the propeller shaft therethrough and an outer rim for engaging the lobes and preventing removal of the propeller housing from the central hub.

It is contemplated to provide a stop member on the outer end of one of the keys. The stop member limits movement of the propeller housing onto the central hub. The inner surface of the propeller housing includes a shoulder formed therein. The outer rim of the locking ring engages the shoulder in order to prevent removal of the propeller housing from the central hub. A locking nut is mountable on the propeller shaft for retaining the locking ring on the propeller shaft. A washer may be disposed between the locking ring and the locking nut for preventing the locking nut from being rotated by the propeller housing.

Each key has a first narrow end and a second wider end, and each keyway of the propeller housing includes a first wide end and a second narrow end such that the wide end of each keyway receives a narrow end of a corresponding key of the central hub as the propeller housing is axially slid onto the hub. As is conventional, the propeller housing includes an outer surface and a plurality of circumferentially spaced propeller blades extending therefrom.

In accordance with a further aspect of the present invention, a propeller assembly is provided for mounting on a rotatable propeller shaft of a watercraft. The propeller assembly includes a central hub mounted on the propeller shaft for rotational movement therewith. The central hub defines a generally cylindrical outer surface having a plurality of circumferentially spaced keys therealong. Each key has a first, narrow end, and a second, wider outer end. A generally tubular propeller housing is slidable onto the central hub for rotational movement with the propeller shaft. The propeller housing includes an inner surface having a plurality of circumferentially spaced pairs of axially extending lobes therealong. Each pair of lobes defines a corresponding keyway receiving a corresponding key along the central hub. A stop member is mounted to the outer end of one of the keys. The stop member limits movement of the propeller housing onto the central hub.

A locking ring is mountable on the propeller shaft. The locking ring includes a generally central disc having an aperture for receiving the propeller shaft therethrough and an outer rim for engaging on a shoulder along the inner surface of the propeller housing in order to prevent removal of the propeller housing from the central hub. A locking nut is mountable on the propeller shaft for retaining the locking ring on the propeller shaft. A washer may be disposed between the locking ring and the locking nut for preventing the locking nut from being rotated by the propeller housing.

Each keyway of the propeller housing includes a wide end and a second narrow end such that the wide end of each keyway receives a narrow end of a corresponding key of the central hub as the propeller housing is axially slid onto the central hub. As is conventional, the propeller housing includes an outer surface having a plurality of circumferentially spaced propeller blades extending therefrom.

In accordance with a still further aspect of the present invention, a propeller assembly is provided for mounting on a rotatable propeller shaft of a watercraft. The propeller assembly includes a central hub mounted on the propeller shaft for rotational movement therewith. A generally tubular propeller housing is slidable into the central hub for rotational movement with the propeller shaft. The propeller housing includes an inner surface having a shoulder formed therein. A locking ring is mountable on the propeller shaft. The locking ring includes a generally circular disc having an aperture for receiving the propeller shaft therethrough and an outer rim for engaging the shoulder and preventing removal of the propeller housing of the central hub.

The central hub defines a generally cylindrical outer surface having a plurality of circumferentially spaced keys therealong. The key has a first, narrow end and a second, wider outer end. The inner surface of the propeller housing includes a plurality of circumferentially spaced pairs of axially extending lobes therealong. Each pair of lobes defines a corresponding keyway for receiving a corresponding key along the central hub. Each keyway of the propeller housing includes a first wide end and a second narrow end such that the wide end of each keyway receives a narrow end of a corresponding key of the central hub of the propeller housing as the propeller housing is axially slid onto the central hub. A stop member is mounted to the outer end of one of the keys. The stop member limits movement of the propeller housing onto the central hub.

A locking nut is mounted on the propeller shaft for retaining the locking ring on the propeller shaft. A washer may be disposed between the locking ring and the locking nut for preventing the locking nut from being rotated by the propeller housing.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 2 is an end view, with portions broken away, showing the propeller assembly of FIG. 1;

FIG. 3 is a cross-sectional view taken of the propeller assembly of the present invention taken along line 3—3 of FIG. 2; and FIG. 4 is a cross-sectional view of a portion of the propeller assembly of the present invention taken along line 4—4 of FIG. 3.

DETAILED DESCRIPTION OF THE DRAWINGS

Figure 1:
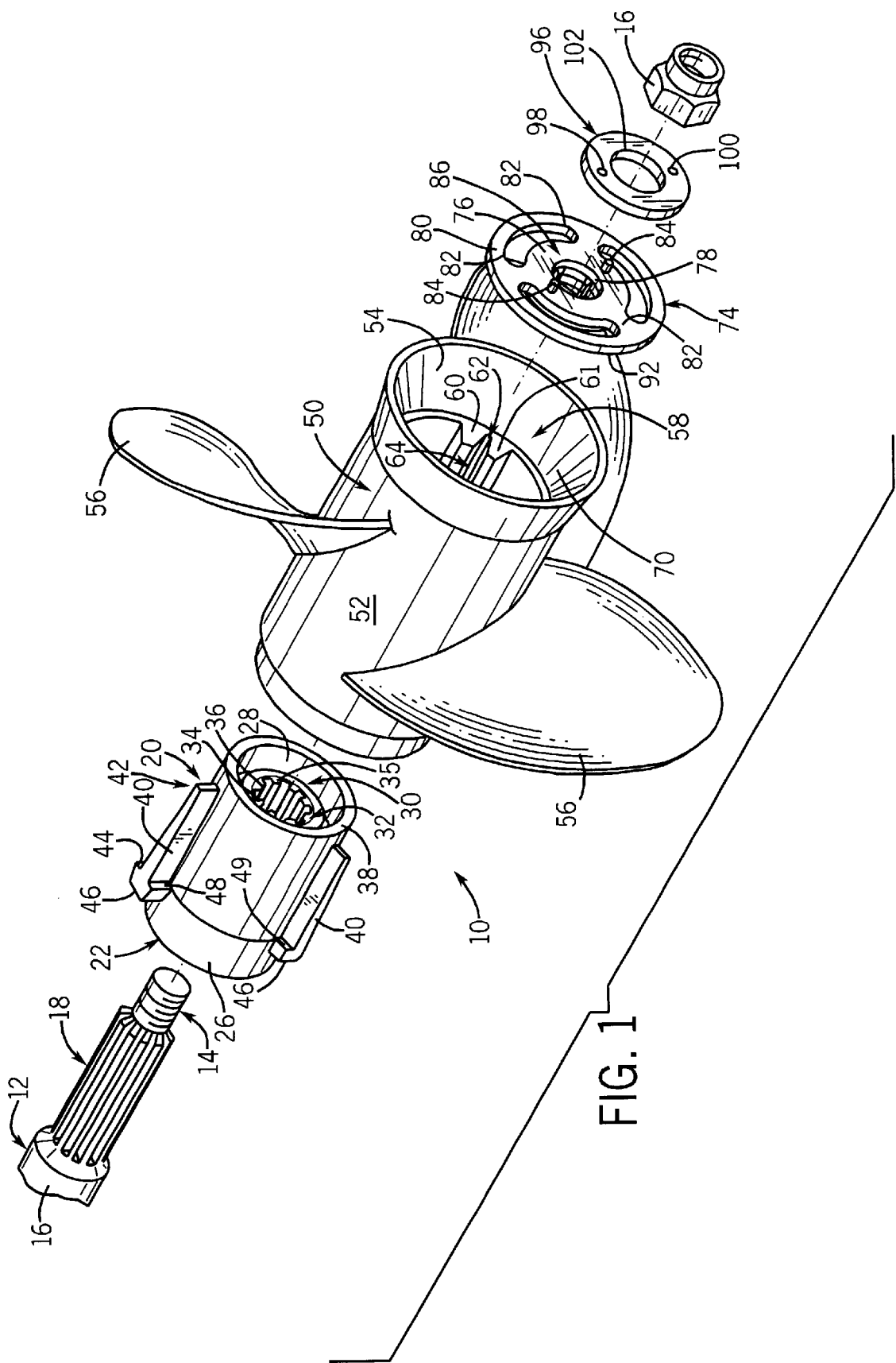
FIG. 1 is an exploded, isometric view of a propeller assembly in accordance with the present invention.

Referring to FIG. 1, a propeller assembly in accordance with the present invention is generally designated by the reference numeral 10. It is intended that propeller assembly 10 be mounted on a rotatable propeller shaft 12 which, in turn, is driven by a marine engine (not shown). Propeller shaft 12 extends along a longitudinal axis and terminates at threaded terminal end 14 adapted for receiving locking nut 16 thereon, for reasons hereinafter described. As is conventional, rotatable shaft 12 includes an outer surface 16 having longitudinally extending splines 18 therealong adjacent terminal end 14.

Referring to FIGS. 1 and 3, propeller assembly 10 includes a central hub 20 formed from an outer shell 22 and a coupling tube 32. Outer shell 22 includes an outer surface 26 and an inner surface 28 which defines a cavity 30 therein. Coupling tube 32 is positioned within cavity 30 defined by inner surface 28 of central hub 20. Coupling tube 32 includes an inner surface 34 having longitudinally extending splines 35 extending therealong which mesh with splines 18 extending along propeller shaft 12 and an outer surface 36. A resilient bushing 38 is disposed between outer surface 36 of connector tube 32 and inner surface 28 of outer shell 22 in order to translate rotational movement of connector tube 32 to outer shell 22.

Outer shell 22 of central hub 20 further includes a plurality of circumferentially spaced, axially extending keys 40. Each key includes a narrow outer end 42 and a wider inner end 44. Stop members 46 are positioned adjacent corresponding inner ends 44 of keys 40 transverse thereto. Each stop member 46 includes first and second stop surfaces 48 and 49, for reasons hereinafter described.

Propeller assembly 10 further includes a propeller housing 50 having an outer surface 52 and an inner surface 54. A plurality of propeller blades 56 project radially from outer surface 52. Inner surface 54 defines a central hub receiving cavity 58 within propeller housing 50. Inner surface 54 of propeller housing 50 includes a plurality of pairs of lobes 60 and 61 which define keyways 62 therebetween for receiving corresponding keys 40 extending along outer surface 26 of outer shell 22 of central hub 20. As best seen in FIGS. 3–4, lobes 60 and 61 include first inner ends 63 and 65 and second outer ends 67 and 69, respectively. Inner ends 63 and 65 terminate at stop member engaging surfaces 63a and 65a, respectively, for engaging corresponding stop surfaces 48 and 49, respectively, of stop members 46. Each keyway 62 includes a narrow outer end 64 for engaging a narrow outer end 42 of a corresponding key 40 and a wider inner end 66 for engaging the wider inner end 44 of a corresponding key 40. Inner surface 54 of propeller housing 50 further includes a generally circular shoulder 70 formed therein, for reasons hereinafter described. Shoulder 70 defines an outer rim engaging surface 71 which is generally co-planer with outer ends 67 and 69 of lobes 60 and 61, respectively. Outer rim engaging surface 71 defines a circle of predetermined outer and inner diameters.

A locking ring 74 is provided for maintaining the propeller housing 50 on central hub 20. Locking ring 74 includes a generally circular central portion 76 having an aperture 78 therein for allowing terminal end 14 of propeller shaft 12 to pass therethrough. Locking ring 74 further includes a generally circular outer rim 80 interconnected to central portion 76 by a plurality of spokes 82. Outer rim 80 has an outer diameter which is greater than the inner diameter of outer rim engaging surface 71 and which is less than the outer diameter of outer rim engaging surface 71.

It is contemplated to provide alignment pins 84 on a first side 86 of locking ring 74 and to provide washers 88 and 90 on a second side 92 of locking ring 74. As best seen in FIG. 3, washers 88 and 90 include apertures 88a and 90a, respectively, therein for allowing terminal end 14 of propeller shaft 12 to pass therethrough. Washers 88 and 90 are sized to be receivable within cavity 30 defined by inner surface 28 of outer shell 22 in a manner hereinafter described. A washer 96 is supported on alignment pins 84 projecting from side 86 of locking ring 74. Washer 96 includes first and second pin apertures 98 and 100, respectively, for receiving corresponding alignment pins 84 projecting from locking ring 74. Washer 96 further includes an aperture 102 for allowing terminal end 14 of propeller shaft 12 to pass therethrough.

In order to assemble propeller assembly 10 on propeller shaft 12, central hub 20 is slid axially onto propeller shaft 12 such that splines 35 extending along the inner surface 34 of coupling tube 32 mesh with splines 18 extending along propeller shaft 12. Thereafter, propeller housing 50 is slid axially onto central hub 20 such that keys 40 extending along outer surface 26 of outer shell 22 of central hub 20 are received within corresponding keyways 62. Initially, outer ends 42 of corresponding keys 40 are received within wider inner ends 64 of keyways 62. Propeller housing 50 is slid onto central hub 30 until such point that stop member engaging surfaces 63a and 65a of corresponding lobes 60 and 61, respectively, engage corresponding stop surfaces 48 and 49 of stop members 46. As described, stop members 46 prevent keys 40 from becoming wedged within corresponding keyways 62.

Locking ring 74 is positioned on propeller shaft 12 such that terminal end 14 of propeller shaft 12 extends through aperture 78 in central portion 76 of locking ring 74. Outer rim 80 of locking ring 74 engages outer rim engaging surface 71 along the inner surface 28 of outer shell 22. Washers 88 and 90 are received within cavity 30 defined by inner surface 28 of outer shell 22 so as to fill the axial space within cavity 30 between end 32a of coupling tube 32 and side 92 of locking ring 74. Washer 96 is positioned on terminal end 14 of propeller shaft 12 such that first and second pin apertures 98 and 10, respectively, receive corresponding alignment pins 84 projecting from side 86 of locking ring 74, and such that terminal end 14 of propeller shaft 12 passes through aperture 102 in washer 96. Locking nut 16 is threaded onto terminal end 14 of propeller shaft 12 to secure propeller assembly on propeller shaft 12.

As described, propeller assembly 10 is secured on propeller shaft 12. If it is desired to replace propeller blades 56 in order for maintenance purposes or simply because circumstances dictate use of propeller blades with different pitch or the like, locking nut 16 is simply removed from terminal 14 of propeller shaft 12 so as to allow washer 96, locking ring 74 and propeller housing 50 to be axially slid from central hub 20. Thereafter, a new or replacement propeller housing 50 may be mounted on central hub 30, as heretofore described. As a result, propeller blades may be replaced without replacing central hub 20 provided therewith. Consequently, propeller assembly 10 of the present invention reduces the time and the costs associated with the replacement of propeller blades.

Various modes of carrying out the invention are contemplated as being within the scope of the following claims particularly pointing out and distinctly claiming the subject matter which is regarded as the invention.

I claim:

1. A propeller assembly for mounting on a rotatable propeller shaft of a watercraft, comprising:
    a central hub extending along an axis and being mountable on the propeller shaft for rotational movement therewith, the central hub defining a generally cylindrical outer surface having a plurality of circumferentially spaced keys therealong, each key having a first, narrow end and a second, wider outer end;
    a generally tubular propeller housing slidable onto the central hub for rotational movement with the propeller shaft, the propeller housing including an inner surface having a ledge formed therein extending circumferentially about the axis and a plurality of circumferentially spaced pairs of axially extending lobes therealong, each pair of lobes defining a corresponding keyway for receiving a corresponding key along the central hub; and
    a locking ring mountable on the propeller shaft, the locking ring including a generally central disc having an aperture for receiving the propeller shaft therethrough and an outer rim for engaging the lobes and the ledge for preventing removal of the propeller housing from the central hub.

2. The propeller assembly of claim 1 further comprising a stop member mounted to the outer end of one of the keys, the stop member limiting movement of the propeller housing onto the central hub.

3. The propeller assembly of claim 1 further comprising a locking nut mountable on the propeller shaft for retaining the locking ring on the propeller shaft.

4. The propeller assembly of claim 3 further comprising a washer disposed between the locking ring and the locking nut for preventing the locking nut from being rotated by the propeller housing.

5. The propeller assembly of claim 1 wherein each key having a first narrow end and a second, wider outer end, each keyway of the propeller housing includes a first wide end and a second narrow end such that the wide end of the each keyway receives the narrow end of a corresponding key of the central hub as the propeller housing is axially slid onto the central hub.

6. The propeller assembly of claim 1 wherein the propeller housing includes an outer surface and a plurality of circumferentially spaced propeller blades extending therefrom.

7. A propeller assembly for mounting on a rotatable propeller shaft of a watercraft, comprising:
    a central hub mountable on the propeller shaft for rotational movement therewith, the central hub defining a generally cylindrical outer surface having a plurality of circumferentially spaced keys therealong, each key having a first inner end and a second outer end;
    a generally tubular propeller housing slidable onto the central hub for rotational movement with the propeller shaft, the propeller housing including an inner surface having a plurality of circumferentially spaced pairs of axially extending lobes therealong, each pair of lobes defining a corresponding keyway for receiving a corresponding key along the central hub;
    a stop member mounted to the outer end of one of the keys, the stop member limiting movement of the propeller housing onto the central hub; and
    a locking structure mountable on the propeller shaft proximate to the inner ends of the keys so as to capture the proper housing on the central hub between the stop member and the locking structure.

8. The propeller assembly of claim 7 wherein the inner surface of the propeller housing includes a ledge therein.

9. The propeller assembly of claim 8 wherein the locking structure includes a locking ring mountable on the propeller shaft, the locking ring including a generally central disc having an aperture for receiving the propeller shaft therethrough and an outer rim for engaging the ledge for preventing removal of the propeller housing from the central hub.

10. The propeller assembly of claim 9 wherein the locking structure includes a locking nut mountable on the propeller shaft for retaining the locking ring on the propeller shaft.

11. The propeller assembly of claim 10 wherein the locking structure includes a washer disposed between the locking ring and the locking nut for preventing the locking nut from being rotated by the propeller housing.

12. The propeller assembly of claim 7 wherein the first end of each key is narrower than the second end of each key and wherein each keyway of the propeller housing includes a first wide end and a second narrow end such that the wide end of each keyway receives the narrow end of a corresponding key of the central hub as the propeller housing is axially slid onto the central hub.

13. The propeller assembly of claim 7 wherein the propeller housing includes an outer surface and a plurality of circumferentially spaced propeller blades extending therefrom.

14. A propeller assembly for mounting on a rotatable propeller shaft of a watercraft, comprising:

a central hub extending along an axis and being mountable on the propeller shaft for rotational movement therewith;

a generally tubular propeller housing slidable onto the central hub for rotatational movement with the propeller shaft, the propeller housing including an inner surface having a shoulder formed therein which extends circumferentially about the axis; and a locking ring mountable on the propeller shaft, the locking ring including a generally central disc having an aperture for receiving the propeller shaft therethrough and an outer rim for engaging the shoulder and preventing removal of the propeller housing from the central hub.

15. The propeller assembly of claim 14 wherein the central hub defines a generally cylindrical outer surface having a plurality of circumferentially spaced keys therealong, each key having a first, narrow end and a second, wider outer end and wherein the inner surface of the propeller housing includes a plurality of circumferentially spaced pairs of axially extending lobes therealong, each pair of lobes defining a corresponding keyway for receiving a corresponding key along the central hub.

16. The propeller assembly of claim 15 wherein each keyway of the propeller housing includes a first wide end and a second narrow end such that the wide end of the each keyway receives the narrow end of a corresponding key of the central hub as the propeller housing is axially slid onto the central hub.

17. The propeller assembly of claim 14 further comprising a stop member mounted to the outer end of one of the keys, the stop member limiting movement of the propeller housing onto the central hub.

18. The propeller assembly of claim 14 further comprising a locking nut mountable on the propeller shaft for retaining the locking ring on the propeller shaft.

19. The propeller assembly of claim 17 further comprising a washer disposed between the locking ring and the locking nut for preventing the locking nut from being rotated by the propeller housing.

* * * * *